Dec. 3, 1968 H. H. CARY 3,414,356
MONOCHROMATOR HAVING LINEAR READOUT OF WAVENUMBER
Filed Aug. 1, 1956 4 Sheets-Sheet 1

HENRY H. CARY,
INVENTOR.

BY
ATTORNEY.

Fig. 2

Dec. 3, 1968  H. H. CARY  3,414,356
MONOCHROMATOR HAVING LINEAR READOUT OF WAVENUMBER
Filed Aug. 1, 1956  4 Sheets-Sheet 3

HENRY H. CARY,
INVENTOR.

BY 
ATTORNEY.

Dec. 3, 1968  H. H. CARY  3,414,356
MONOCHROMATOR HAVING LINEAR READOUT OF WAVENUMBER
Filed Aug. 1, 1956  4 Sheets-Sheet 4

HENRY H. CARY,
INVENTOR.

BY
ATTORNEY

United States Patent Office 3,414,356
Patented Dec. 3, 1968

3,414,356
MONOCHROMATOR HAVING LINEAR
READOUT OF WAVENUMBER
Henry H. Cary, Alhambra, Calif., assignor to Applied
Physics Corporation, Monrovia, Calif., a corporation of
California
Filed Aug. 1, 1956, Ser. No. 601,493
13 Claims. (Cl. 356—100)

This invention relates to improvements in spectroscopy and more particularly to an improved scanning mechanism for use in diffraction-grating monochromators.

Though applicable to other types of diffraction grating monochromators the invention will be described specifically with particular reference to the usual type of a Littrow monochromator in which heterogeneous radiation entering an entrance slit or other aperture is directed along a first fixed axis to a rotatable diffraction-grating and monochromatic radiation emerging from the diffraction-grating along a second fixed axis is transmitted to an exit slit or other aperture. In such a monochromator the incident and diffracted rays travel along paths on the same side of the diffraction grating. In order to ascertain the spectrum of the heterochromatic radiation entering the entrance slit, the diffraction-grating is generally rotated relative to said two axes while they remain stationary and measurements are made of the intensity of monochromatic radiation emerging from the exit slit for different positions of the diffraction grating. A common control mechanism is sometimes employed to scan the spectrum by rotating the diffraction grating and to simultaneously record the spectrum by moving a recording paper or other recording medium past a recording element. The recording element itself is usually arranged to be displaced from a zero axis or baseline by an amount corresponding to the intensity of the radiation emerging from the exit slit or by an amount corresponding to the ratio of the intensity of two branches of the exit beams, one of which has passed through a sample under investigation and the other of which has been passed through a reference sample or a sample-free space. In any event, the spectrogram so produced represents a plot of the distribution of exit beam intensity as a function of diffraction grating position. Various mechanisms have been devised in the past for advancing the recording medium past the recording element at such a rate that the spectrogram is displayed as a graph in which beam intensity is plotted as ordinates as a function of wavelength as abscissae, and in which wavelength is indicated on a linear scale.

In such a diffraction grating monochromator, the following well-known relationship exists:

$$\sin \theta = n\lambda/2ac \qquad (1)$$

where $\theta$ = angle between the normal to the grating and the line bisecting the angle between the incident and diffracted beams;
$n$ = order of the spectrum;
$\lambda$ = wavelength;
$a$ = grating spacing, or grating line separation.

In this equation, the constant $c$ depends on the geometry of the ray path and is equal to nearly 1 when the incident and diffracted ray paths nearly coincide, as in the specific example of the invention described hereinafter.

In a monochromator in which the entrance and exit slits remain stationary and in which the grating rotates, the wavelength $\lambda$ of the emergent radiation varies as a function of the angle $\theta$ and hence the angle through which the grating is rotated. It is to be noted that when $n$ equals zero, the value of $\theta$ is also zero, irrespective of wavelength. This corresponds to the "zero-order" or mirror position, that is, the position in which the grating reflects light of all wavelengths specularly along the same path to the exit slit.

Sometimes monochromatic radiation is described by its wavenumber $\nu$ rather than by its wavelength $\lambda$. The relationship between wavenumber and wavelength is well known to be $$\nu\lambda = k \qquad (2)$$

where $k$ = a constant

In a particular case in which the wavelength $\lambda$ is expressed in $\mu$ (microns), and the wavenumber $\nu$ is expressed in reciprocal centimeters (cm.$^{-1}$), or kaisers, the value of $k$ is $10^4$. In this case, the wavenumber $\nu$ represents the number of waves present in one centimeter of length along a beam of light having a wavelength $\lambda$ in vacuum. The wavenumber $\nu$ is directly proportional to the frequency $f$ of the radiation. Since the values of frequency are proportional to the differences between energies of various energy levels of materials that radiate and absorb radiation, it is frequently very desirable to describe monochromatic spectral lines by their frequency or wavenumber rather than by their wavelength.

Raman type spectroscopy is often employed in the analysis of the resonance spectra of substances undergoing analysis, whether they be pure substances or mixtures. In the Raman process, monochromatic exciting radiation of a predetermined wavelength, such as that from a particular mercury (Hg) line, is directed toward the material undergoing analysis. The photons of such exciting radiation are absorbed by molecules or atoms, or otherwise interact with them, in such a way that a quantized exchange of energy occurs. As a result, after such interaction has occurred, a photon having a different energy is scattered from the material, the energy of the photon either being increased or decreased, as the case may be, by an amount that corresponds to differences in energy levels characteristic of the scattering material. If, for example, the exciting radiation has a frequency $f_1$ or wavenumber $\nu_1$, and the frequency $f_0$ or wavenumber $\nu_0$ corresponds to a specific difference of two energy levels of a molecule involved in the scattering process, then, if such interaction occurs, the photon that is emitted from the scattering material usually has a different energy corresponding to a different frequency $f_2$ or wavenumber $\nu_2$. The three frequencies in question are related by the equation:

$$f_2 = f_1 \pm f_0 \qquad (3a)$$

Similarly, the wavenumbers are related by the equation:

$$\nu_2 = \nu_1 \pm \nu_0 \qquad (3b)$$

It is to be noted that if the frequency or wavenumber of the exciting radiation is changed, the frequency and wavenumber of the scattered radiation are changed by an equal amount, since their difference is always equal to a frequency $f_0$ or a wavenumber $\nu_0$ characteristic of the scattering material.

It is therefore apparent that it is particularly desirable to plot the monochromatic radiation emerging from a monochromator in terms of a linear wavenumber scale when the monochromator is employed in the analysis of a Raman spectrum. By expressing the results in terms of a linear wavenumber scale, it becomes an easy matter to compare the results of Raman spectra obtained by means of exciting radiation having different frequencies. Such a comparison may be made most easily by placing the origin of the two spectrograms at the points on the spectograms corresponding to the frequencies of the exciting radiation. Even with other types of spectra, the use of a linear wavenumber scale is advantageous because of the fact that energy level differences are proportional to wavenumbers.

It is also desirable to plot absorption or emission characteristics as a function of frequency or wavenumber in absorption and emission spectroscopy because frequency or wavenumber in such a case is proportional to the energy changes that account for the absorption or emission, as the case may be.

An object of the invention is to provide a cam mechanism which rotates a diffraction grating by means of an element which is displaced along a straight line by an amount which is proportional to the wavenumber of the monochromatic radiation transmitted by the monochromator.

Another object of the invention is to provide such a drive mechanism with means for indicating the displacement of the driving cam and calibrated to indicate wavenumber of transmitted monochromatic radiation.

Another object of this invention is to provide a recording spectrophotometer in which spectral intensities are plotted as ordinates in terms of a linear wavenumber scale as abscissae.

Still another object is to provide a scanning mechanism consisting of geometrically simple mechanical parts, to produce a theoretically exact linear frequency, or wavenumber, scale in a spectrophotometer.

And still another object is to provide such a scanning mechanism that consists of mechanical parts which are readily formed with great accuracy such as spheres, flats, screws, nuts and cylinders.

The manner in which the foregoing and other objects of the invention are attained will appear more fully from a consideration of the following description of specific embodiments of the invention taken in connection with the accompanying drawings wherein.

Figure 1A:
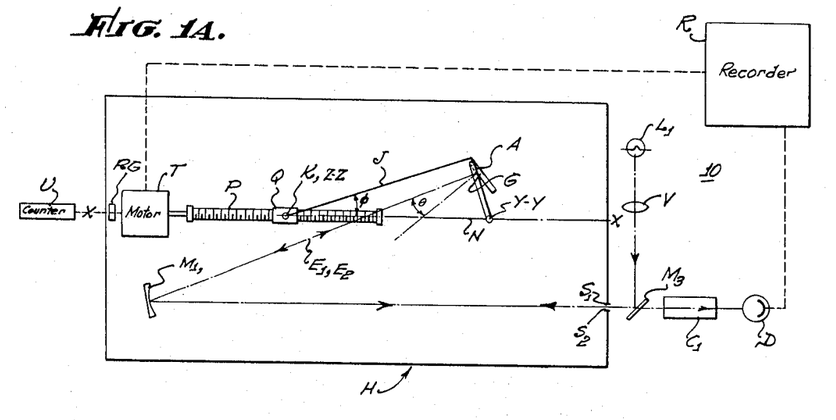
FIG. 1A is a schematic diagram of an embodiment of the invention taken in a vertical plane.

In FIGURE 1A there is illustrated a spectrophotometer embodying the present invention. The spectrophotometer comprises a diffraction grating $G$ rigidly mounted on a plate $A$ that is arranged to be pivoted about a horizontal pivot axis $Y$—$Y$ normal to the plane of the paper. The plate $A$ is mounted within a housing $H$ which is a support for the components of the apparatus and has slightly curved entrance and exit slits $S_1$ and $S_2$ located symmetrically at the same level on opposite sides of a vertical reference plane that is normal to and bisects the grating lines. Heterochromatic radiation entering the housing $H$ through the entrance slit $S_1$ is projected as a collimated incident beam along incident path $E_1$ toward the diffraction grating $G$ by means of a collimating mirror $M_1$. Radiation that is diffracted by the diffraction grating is returned therefrom as a collimated diffracted beam along diffraction path $E_2$ and is focused on the exit slit $S_2$ by the collimating mirror $M_1$. The two paths $E_1$ and $E_2$ lie one above the other, and they are inclined only slightly but in opposite directions relative to the vertical reference plane.

As is well known, such a diffraction grating disperses the heterochromatic radiation falling upon it and returns to the exit slit $S_2$ monochromatic radiation having a wavenumber $\nu$ and a wavelength $\lambda$ given by the following well-known equations:

$$\sin \theta = n\lambda/2ac \quad (1)$$

$$\nu\lambda = k \quad (2)$$

where the terms $c$, $\lambda$, $n$, $k$, $a$, and $\theta$ have the meanings described above. In the particular case illustrated in FIG. 1A, the grating lines are horizontal, and the beam that is incident upon the diffraction grating and the beam that is diffracted from the grating travel in the same direction relative to a horizontal plane. The bisector between the central rays of these beams coincides in the vertical reference plane with the projections of the paths of the central rays of both the incident and the diffracted beams on the reference plane. This characteristic, however, is not to be considered a limitation on the invention, since it is not necessary for the entrance and exit slits $S_1$ and $S_2$ to lie in symmetrical positions relative to the vertical reference planes.

When the diffraction grating $G$ is rotated about the axis $Y$—$Y$, the wavelength and wavenumber of the radiation emerging from the exit slit $S_2$ is varied. Thus, a monochromator of variable wavelength and wavenumber is provided.

In absorption spectroscopy, heterochromatic radiation to be dispersed is projected into the housing through the entrance slit $S_1$ from a source, such as an incandescent lamp $L_1$, by means of a condensing lens $V$ and a plane mirror $M_3$.

Radiation emerging from the exit slit $S_2$ is transmitted through a sample cell $C_1$ containing a substance undergoing analysis. The response of a photocell $D$ upon which such radiation falls after transmission through the cell, is measured at a series of wavelengths or wavenumbers. In this way an absorption or transmission spectrum of a sample is obtained.

Figures 1B, 9:
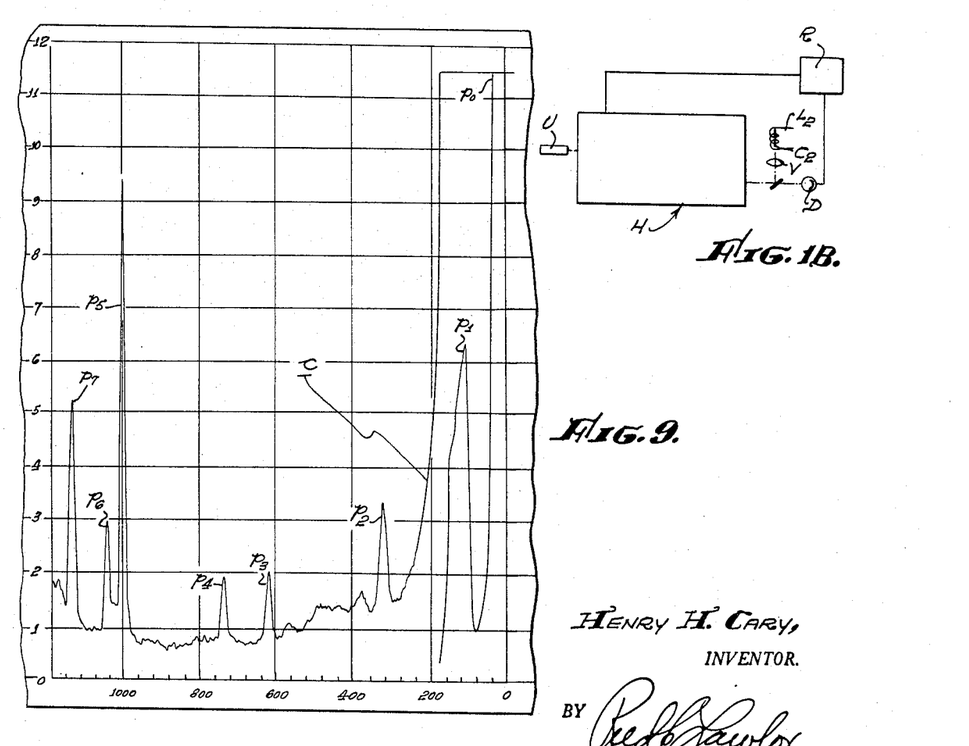
FIG. 1B is a similar schematic diagram of an alternative embodiment of the invention.
FIG. 9 is a part of a Raman spectogram produced in accordance with this invention.

An arrangement for producing a Raman spectrum is illustrated in FIG. 1B. As illustrated in this figure, to produce a Raman spectrum, the same monochromator is employed, but in this case the lamp source $L_1$ is replaced by a helical source $L_2$, and the sample cell $C_2$ is arranged coaxially within the helical source $L_2$. In this case, monochromatic radiation emitted from the source $L_2$ excites molecules of the sample in the sample cell $C_2$, causing a heterochromatic spectrum of Raman lines to emerge therefrom. The lens $V$ concentrates energy containing such Raman emission lines on the entrance slit $S_1$. During scanning, monochromatic Raman lines that are dispersed by the monochromator emerge from the exit slit $S_2$ one at a time and are focused on the photocell $D$. An improved optical system for efficiently transmitting Raman emission lines from a sample into a monochromator is described and claimed in copending patent application Serial No. 569,177, filed March 2, 1956 now Patent No. 2,940,355.

As shown in FIGS. 1A and 1B, both in absorption spectroscopy and in Raman spectroscopy, the output of the photocell $D$ is applied to an automatic recorder $R$ which is arranged to drive a recording medium, such as a strip of record paper, past a recording element, such as a recording pen, in synchronism with the rotation of the diffraction grating $G$ or other rotatable dispersing element in the monochromator. In accordance with this invention as explained in more detail hereinbelow, the recording medium is displaced at a rate proportional to the rate of change of wavenumber of the emergent monochdomatic radiation so that the spectrum recorded is automatically plotted in terms of a uniform wavenumber ($\nu$) scale. The general principles underlying this invention and details of a scanning mechanism utilizing those principles are explained and described hereinbelow.

In accordance with this invention, a movable cam member Q that has a horizontal central axis Z—Z (FIG. 4) normal to the reference plane is employed to rotate the grating G by virtue of its action on a cam bar B that is rigidly secured to a rotatable member in the form of the plate A upon which the grating G is mounted. In its simplest form, the movable bar B is an inclined bar and has a cam surface in the form of a straight edge J (FIG. 3), and in its simplest form the cam member Q is provided with a cam element K (FIGS. 4 and 5) in the form of a pin or wheel or sphere which cooperates with the straight edge in such a way that the distance of the straight edge from the horizontal axis Z—Z remains constant as the grating is rotated. Such a cam element, when a sphere or a wheel, has a circular cross-section in a vertical plane.

The movable cam member Q comprises a nut mounted upon a lead screw P and constrained against rotation for moving the cam axis Z—Z along a straight stationary horizontal line X—X that is parallel to the reference plane and passes through the horizontal axis Y—Y. As the cam member is moved along the straight line X—X, it rotates the diffraction grating G about the horizontal pivot axis Y—Y by virtue of the constant engagement of the cam element with the movable bar B.

It can readily be shown that the position of the straight edge may be described by the following equation:

$$\sin \phi = \frac{R_1 + R_2}{D} \quad (4)$$

where $R_1$ = effective radius of cross section of cam element in the reference plane to the edge or surface J;
$R_2$ = offset of the straight edge from the stationary pivot axis Y—Y of the grating;
D = distance between the axis Y—Y and the axis Z—Z;
$\phi$ = angle of the straight edge relative to the axis X—X.

In accordance with this invention, the relationship expressed by Equation (4) is employed in connection with the relationship expressed by Equation (1) to produce a scanning mechanism in which the displacement of the movable cam member Q along the axis X—X is directly proportional to the change in wavenumber of monochromatic radiation emerging from the exit slit $S_2$.

Figures 3, 4, 5, 6:
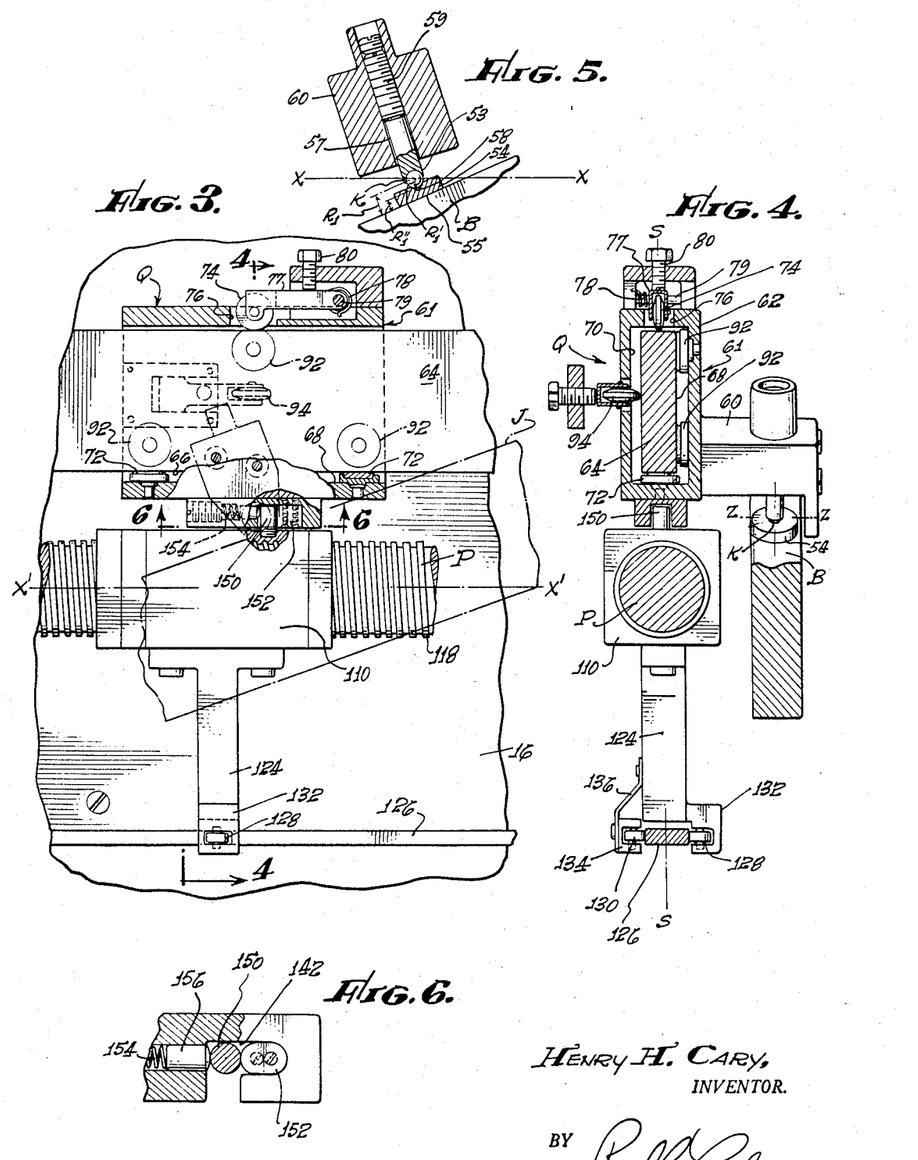
FIG. 3 is an enlarged fragmentary view of a part of the cam driving mechanism.
FIG. 4 is a vertical sectional view taken on the line 4—4 of FIG. 3.
FIG. 5 is a detailed vertical sectional view of a part of the cam drive mechanism.
FIG. 6 is a horizontal view taken on the line 6—6 of FIG. 3.
Figure 7:
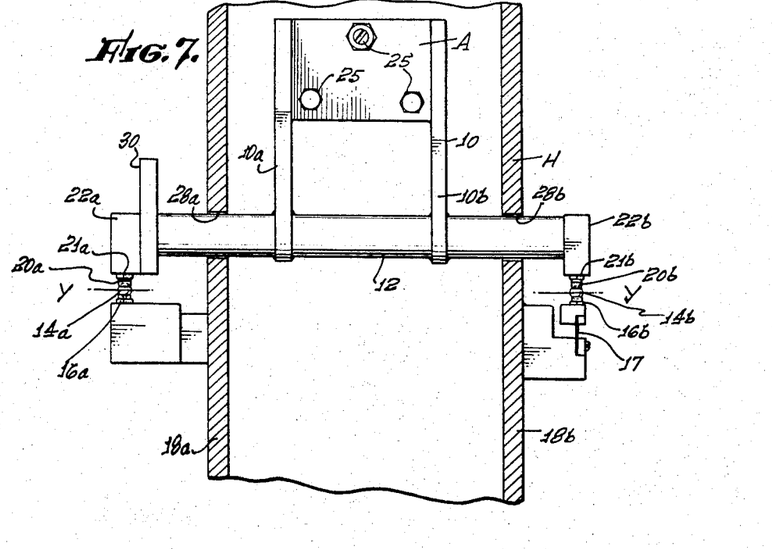
FIG. 7 is a fragmentary vertical transverse view taken on the line 7—7 of FIG. 2.

One way to achieve the desired proportionality is to set the bar B in a position parallel to the axis X—X and then to rotate the grating G to its mirror position, that is to a position in which the normal to the grating is parallel to the bisector between the incident and diffracted beams $E_1$ and $E_2$. The latter adjustment may be accomplished by rotating the grating G to such a position that heterochromatic radiation incident thereon is reflected therefrom without dispersion while the bar B is set in the aforementioned position. When the grating is rotated to this position, and white light enters the entrance slit $S_1$, white light also emerges from the exit slit $S_2$. Once such an adjustment has been made, the cam bar B is returned to its normal position in which it is engaged by the ball cam K (FIGS. 4 and 5). In such a case, the angle of the cam bar relative to the horizontal axis X—X equals the angle of diffraction in all positions as the grating is rotated. In other words:

$$\phi = \theta$$

Under such conditions, Equations (1) and (4) can be combined to show that:

$$\nu = KD \quad (5)$$

where:

$$K = \frac{nk}{2ac(R_1 + R_2)} \quad (6)$$

It is to be noted that Equation (5) implies that when the cam member is moved an increment of distance $dD$, then the wavenumber of the monochromatic radiation emerging from the exit slit changes by a proportional amount $KdD$.

It is to be noted that the values of $R_1$ and $R_2$ are both positive when the straight edge intersects the axis X—X between the two axes Y—Y and Z—Z, but that they are of opposite sign if the straight edge intersects the axis X—X outside of this region. Though the value of either $R_1$ or $R_2$ may be zero, in the specific embodiment of the invention described hereinafter, they are both positive and the value of $R_1$ is very small compared to that of $R_2$.

It is convenient to define an offset reference plane as a plane which makes an angle relative to the grating G and rotates with the grating G, but which is normal to the axis of the lead screw P when the wavenumber is 0 and is always normal to the straight edge J of the movable arm B. As previously mentioned, the simplest types of elements to employ to attain the desired proportionality described by Equation (5) are a cam element K of circular cross section in a horizontal plane, and a movable bar B having a straight edge. In this case, the straight edge J is normal to the offset reference plane. However, it will be understood that the shape of either the cam element K or the cam bar B or both may be varied from the respective spherical and rectilinear shapes previously mentioned. In any event, the shapes of the cam surfaces are so related to each other that when the two cam surfaces are engaged in any position of the movable cam member Q along the axis X—X, there exists a horizontal axis Z—Z in the cam that is parallel to the pivot axis Y—Y and for which the geometrical projection of that axis Z—Z onto the offset reference plane remains a fixed distance from the pivot axis Y—Y of the grating. In other words, the offset distance of this projection from the axis Y—Y remains constant as the grating rotates. In such event the rotation of the grating follows a cosecant law in which the cosecant of the angle $\theta$ of the grating from its mirror position is proportional to the distance of the axis Z—Z from the axis Y—Y, thus:

$$\csc \theta = \frac{D}{R_1 + R_2} = \frac{2ac\nu}{nk} \quad (7)$$

where D is the distance.

In other words equal changes in linear position of the cam member Q in the direction of the axis X—X produce equal changes in the cosecant of the angular position of the grating from its mirror position. For this reason the cam mechanism is referred to broadly as a mechanical cosecant transformer. With such an arrangement any device that measures changes in position of the cam member Q indicates proportional changes in wavenumber.

Though the edge J has been referred to as a straight edge, it is sometimes desirable to curve this edge slightly so as to compensate for slight deviations from linearity of wavenumber scale that would otherwise arise because of the variable flexure to which the bar B is subjected when scanning a spectrum from one end to the other.

Such flexure may be reduced by employing a very rigid follower cam bar B. In either event the effective shape is that of a straight edge.

In the simplest form of the invention, the lead screw is driven by an electric motor T; and a counter U such as a Veeder counter driven by the motor T is employed to indicate the number of turns made by the lead screw P and hence the displacement of the movable cam member Q. The motor T is also employed to drive a recording medium, such as a strip of recording paper, past a recording element of the recorder R at a uniform rate. With such an arrangement, the displacement of the recording paper is directly proportional to the displacement of the movable cam member and hence to the change in wavenumber $\nu$. Likewise, a change in the reading of the counter U is directly proportional to changes in wavenumber. By employment of a suitable reduction gear RG the counter U indicates wavenumber directly. In such a counter, wheels bearing digits are rotated into place in front of a window, where the wavenumber may be read by the user.

A specific embodiment of the invention is illustrated in some detail in FIGS. 2 to 7 inclusive. In this monochromator, the diffraction grating G is adjustably mounted on a plate A for rotation about the horizontal axis Y—Y. The plate is rigidly supported (FIG. 7) by means of arms 10a and 10b on a rocker arm cross rod 12 that is supported on spherical bearings 14a and 14b at its ends. One of the bearings 14a rests in a hemispherical seat 16a which is rigidly mounted on one side wall 18a of the housing H. The other spherical bearing 14b is seated in a hemispherical seat 16b which is resiliently mounted by means of a leaf spring 17 on the other side wall 18b of the housing H. The crossbar 12 is provided with upper hemispherical sockets 20a and 20b formed in the lower ends of adjusting screws 21a and 21b which are adjustably positioned vertically within blocks 22a and 22b that are secured to the ends of the crossrod 12. It is to be noted that the spherical bearings are mounted externally of the housing H and that the rod 12 passes through slots in the side walls to permit free rotation of the grating G about the stationary horizontal pivot axis Y—Y.

The grating G is arranged to be accurately positioned on the plate A by manipulation of screws 25 forming part of a cone-slot-plane kinematic locator of the type referred to in Strong's "Procedures in Experimental Physics," chapter XIV, page 587. The grating G is mounted with the lines of the grating parallel to the axis Y—Y passing through the centers of the spherical bearings 14a and 14b and with the normal N to the surface of the grating lying in a vertical reference plane normal to the axis Y—Y. In this form of the invention, the movable cam bar B having the straight edge J is rigidly secured to a mounting plate 30 which itself is rigidly secured to the rocker arm cross rod 12 at the end thereof. The angle θ between the grating normal N and the light beam is made equal to the angle φ between the straight edge and the axis of the screw P, and the two angles increase and decrease together. The cam member Q is of a compound nature as described below. The axis Z—Z of the cam element K actually lies on the axis X—X, but the axis X'—X' of the lead screw P is offset from the axis X—X and is parallel thereto.

The cam member Q includes a block 60 extending laterally from a carriage 61 that travels on a fixed guide rail 64 in a direction parallel to the axis X'—X' of the lead screw P. The cam member Q includes a cam element K in the form of a spherical bearing as shown in FIG. 5. The spherical bearing K rests in a hemispherical cavity 58 formed in the outer surface of a pad 54 that has a flat base in sliding contact with the upper surface or straight edge J of the follower cam bar B. The lower end 57 of the adjusting screw 59 carried by the block 60 is provided with a socket the outer end 53 of which is swaged over the bearing K to lock it in place.

The guide rail 64 is of rectangular cross section, being in the form of a flat bar that is mounted rigidly on the side wall 18a in a plane that is parallel to the axis X'—X' of the lead screw P. The lower face 66 and the outer face 68 of the guide rail are machined and polished to form flat plane surfaces to insure accuracy of movement of the spherical bearing.

The carriage 61 has a rectangular configuration and is provided with a rectangular opening 70 so that it may be mounted in encircling relationship with the guide rail 64. Two pads 72 located in the lower portion of the opening 70 engage the lower flat surface 66 of the guide rail. The lower pads 72 are resiliently urged upwardly against the surface 66 by means of a spring-biased wheel or roller 74 that projects through an opening 76 in the upper wall of the carriage 61. The wheel 74 is resiliently urged against the upper surface of the guide rail 64 by means of a helical spring 78 mounted on the axle 79 that forms the pivot of an arm 77 at the outer end of which the wheel 74 is mounted. An adjustable screw 80 is arranged above the upper end of the arm 77 to limit its motion.

The centers of the two pads 72 lie in the plane passing through the center of the wheel 74 and this plane is vertical and bisects the guide rail. With this arrangement there is very little tendency of the carriage to move from side to side as it is advanced along the length of the guide bar 64.

In a similar way three pads 92 are arranged in the opening 70 on one side of the carriage and in engagement with the flat side-surface of the guide rail 64 and a spring urged wheel 94 arranged on the opposite side of the carriage is employed to urge these pads 92 against the flat surface 68.

By virtue of the cooperative action of the two spring-urged wheels 74 and 94, the center of the spherical ball K can be moved along the horizontal travel axis X—X that extends through the grating pivot axis Y—Y, while accurately maintaining the center of the ball K in a vertical plane containing the travel axis. The follower cam bar B is urged against the pad 54 and against the spherical bearing K by means of a counterweight 100 (FIG. 2) that applies an upwardly directed force to the free end of the follower bar B through a cable 102 supported by a pulley 104 located above the uppermost position that may be assumed by the follower bar B.

In this particular case, the total offset distance between the stationary pivot axis Y—Y passing through the spherical bearings 14a and 14b and the moving-cam axis Z—Z is 6″ and is made up of three parts, namely the radius $R_1'$ of the cam K, the minimum thickness $R_1''$ of the pad 54, and the distance $R_2$ of the straight edge from the axis Y—Y. In this specific embodiment of the invention, the values of these distances were:

$$R_1'=\tfrac{1}{16}''$$
$$R_1''=\tfrac{1}{16}''$$
$$R_2=5\tfrac{7}{8}''$$

All three of these distances are collinear in a direction parallel to the offset reference plane.

It is to be noted that the total distance by which the axis Z—Z of the cam element K is offset from the straight edge is:

$$R_1=R_1'+R_1''$$

and that $R_2$ is the distance by which the straight edge J is offset from the axis of rotation Y—Y; and the total distance by which the axis Z—Z of the cam element K is offset from the grating axis Y—Y in the offset reference plane is $R_1'+R_1''+R_2$. This accounts for the total offset distance of 6″.

The carriage 61 is moved back and forth along the guide rail 64 by means of a nut 110 threadably engaging the lead screw P. The threads 118 of the lead screw are of square cross-section, and the helical side surfaces thereof that face either way in the direction of the axis X'—X' from the thrust bearing 160 are polished.

Figure 8:
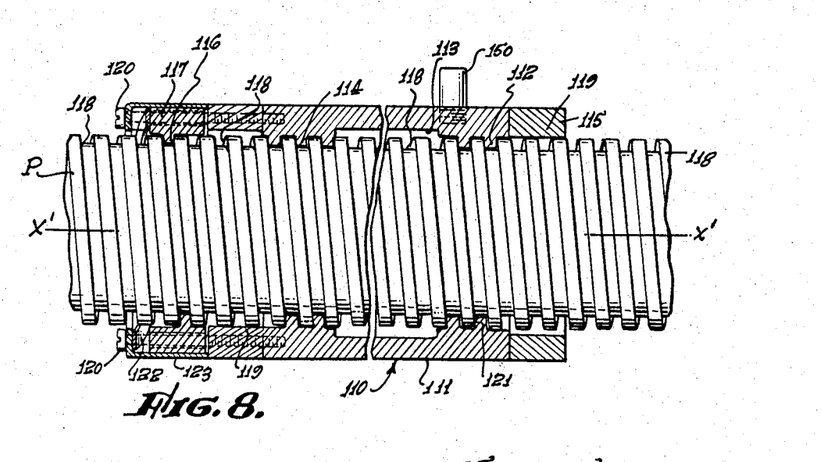
FIG. 8 is an enlarged cross-sectional view of the leadscrew and nut.

The nut itself is of a compound character, being provided with first, second, and third sets of threads 112, 114 and 116 (FIG. 8). The first set of threads 112 is located at the end of the nut nearest the axis Y—Y. The second or intermediate, set of threads 114 is located on the nut at a point intermediate its ends. These two sets of threads 112 and 114 are polished to fit the sloping or helical surfaces 121 of threads 118 of the lead screw P that face toward the pivot axis Y—Y. The two sets of threads 112 and 114 are formed on a common cylindrical body 111 and are separated by an annular valley or channel 113. Two nut guides 115 and 117 secured at opposite ends of the nut body 111, are provided with at least three uniformly spaced lands 119 having cylindrical surfaces that engage the outer cylindrical crown surfaces of the threads 118. The nut guides thus preserve a fixed coaxial relationship between the screw P and the nut body 111. The threads 112 and 114 are spaced from the crown and root surfaces of the screw threads 118 and engage only the helical surfaces thereof as mentioned. The third set of threads 116 are arranged in the guide ring 117 that floats on mounting screws 120. The ring 117 is resiliently urged toward the other threads 112 and 114 by means of a circular compression spring 122 which encircles the lead screw P and is held in place by cap ring 123. The spring 122 acts on the floating thread ring 117 to urge the threads 112 and 114 toward the pivot axis and firmly against the helical surfaces of thread 118 of the lead screw P, thus eliminating backlash and assuring accurate and reproducible positioning of the nut along the axis X—X.

The nut 110 is constrained against rotation about the axis X—X of the lead screw by means of a stabilizing mechanism which includes an outrigger arm 124 extending downwardly from the nut 110 and a stabilizer rail 126 that is supported on the side wall 18a of the housing H. The stabilizer rail 126, the lead screw P, and the guide bar 64 are coplanar lying in a plane of symmetry S—S as seen in FIG. 4. As also shown in FIG. 4 two rollers 128 and 130 are rotatably mounted at the lower end of the stabilizing arm 124. One of the rollers 128 is pivotally supported on an arm 132 projecting laterally from the stabilizing arm 124 and rigidly supported thereon while the other roller 130 is rotatably supported on a mounting 134 which is resiliently supported at the lower end of the stabilizing arm 124 by means of a spring 136. The spring 136 is arranged to urge the two rollers 128 and 130 into firm contact with the side surfaces of the stabilizing rail 126. The surface contacted by the roller 128 is accurately machined so as to prevent rotation of the nut 110 about the axis X′—X′.

A special coupling illustrated in detail in FIGS. 3, 4 and 6 is employed between the nut 110 and the carriage 61 in order to insure accurate movement of the spherical cam K in the direction of axis X—X in accordance with the rotation of the lead screw P. This coupling includes a drive pin 150 secured to the nut 110 and projecting upwardly therefrom from a point opposite the end thread 112. The drive pin 150 projects into a slot 142 in the lower side of the carriage 160 where it is urged by means of a spring-biased slug 156, against a bearing member 152 secured firmly on the carriage. The pin 150 and the bearing member 152 are case-hardened to reduce wear and their axes lie in the plane of symmetry S—S thus assuring accurate reproducible movement of the carriage 61 with the nut 110 over a long period of use.

Figure 2:
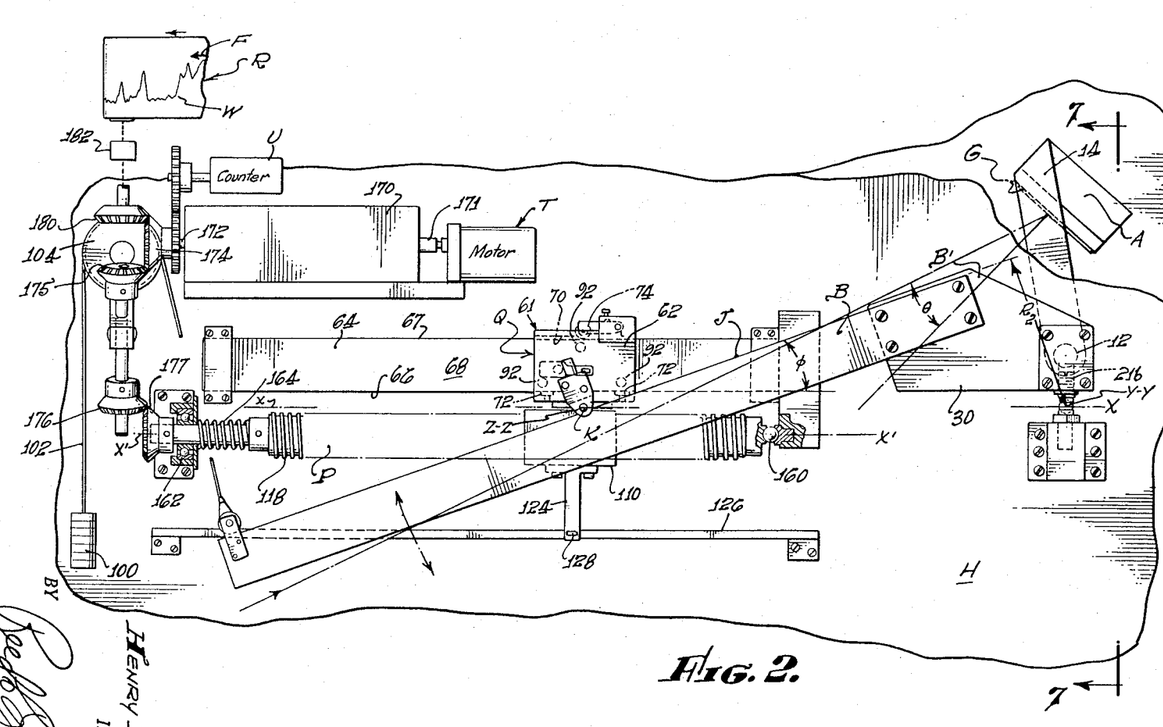
FIG. 2 is a vertical fragmentary elevational view showing the scanning mechanism and the parts operated by means of it.

As a further aid in accurate positioning of the spherical cam K, the end of the lead screw P nearest the axis Y—Y is supported by means of a single spherical thrust bearing 160 (FIG. 2). The other end of the lead screw P is supported in a roller bearing 162, and a helical spring 164 is employed to urge the lead screw P toward the bearing 160.

In this specific embodiment of the invention, the motor T is a four-pole reversible induction motor having a speed-reducing gear 170 connected to its drive shaft 171. An output spur gear 172 drives a counter U directly. An output bevel gear 174 is employed to drive the lead screw P through suitable gearing including bevel gear 175, bevel gear 176, and bevel gear 177. A second driven bevel gear 180 driven by the output bevel gear 174 is employed to drive a strip of paper W in the recorder R in a conventional manner past a recording pen F that responds to the photocell D and its associated amplifier (not shown). The recording paper is provided with lines (FIG. 9) representing Cartesian coordinates. A one-way-operating clutch 182 connected between the bevel gear 180 and the recorder R makes it possible to drive the paper in only one direction, namely, while the spectrum is being scanned in one particular direction corresponding to reducing wavenumber, and permits the paper to remain at rest when the rotation of the lead screw P is reversed in order to return the cam member Q and the cam bar B to their initial or starting position.

When a spectrum is to be scanned, the motor T is operated to drive the nut 110 to a starting position at the left end of the lead screw P. The starting position establishes the maximum wavenumber of the spectrum that is to be observed. After the sample has been placed in position the motor is driven in the forward direction causing the lead screw P to rotate at a uniform speed, thus driving the nut 110 along the lead screw and toward the axis Y—Y. As the nut 110 is advanced along the lead screw P, the spherical cam K is moved at a uniform speed along the axis X—X, acting upon the cam bar B to rotate the grating G at such a variable rate that the wavenumber of the radiation emerging from the exit slit $S_2$ is gradually reduced at a uniform rate. Simultaneously, the counter U is rotated at a uniform rate, so that, at any one time, the counter correctly indicates the wavenumber of the radiation that is emerging from the exit slit $S_2$. Also simultaneously, the recording paper W is advanced at a uniform speed past the recording pen F of the recorder R, causing a spectrogram to be recorded with a uniform, or linear, wavenumber scale.

After a spectrogram has been recorded, the direction of rotation of the motor T is reversed, causing the nut 110 and the cam bar B to be returned to their starting positions at the left end of the lead screw.

A spectrogram of the type recorded by means of a Raman spectrometer employing this invention is illustrated in FIG. 9. There it will be noted that a curve or graph c represents the Raman spectrum of a sample, with intensity being plotted as ordinates against wavenumber differences as abscissae. The initial or central overloaded peak $P_0$ is caused by the exciting radiation. The other peaks $P_1$ . . . $P_7$ represent the intensities of emission lines characteristic of the sample undergoing analysis. It will be noted that the abscissae represent the difference in wavenumber of the monochromatic radiation emerging from the exit slit $S_2$ and the wavenumber of the exciting radiation. The particular spectrum illustrated was produced by exciting a sample of 20% solution of sodium benzenesulphonate with mercury line radiation having a wavelength of 4358 A.

In order to take full advantage of the simplicity of this invention, the gear ratios are so chosen that the counter U reads wavenumbers directly in cm.$^{-1}$. When employing a replica grating G having 12,000 lines/cm., it is possible to achieve accurate reading of the wavelength of monochromatic radiation emerging from the monochromator to an accuracy of 0.5 cm.$^{-1}$ at a wavenumber near 20,000 cm.$^{-1}$. In order to attain such accuracy the various critical parts of the scanning mechanism including those of the cosecant transformer are machined and polished to a high degree of smoothness at the time of manufacture. To prepare the instrument for use, the scanning mechanism is calibrated by the following steps:

(1) The adjusting nuts 20a and 20b are manipulated in order to set the center of the cam bar B accurately in a plane that is normal to the axis Y—Y and that is parallel to the axis of the guide bar. Thus, an axis X—X passing through both the stationary pivot axis Y—Y and the ball cam K is established. The same adjustment permits setting the value of $R_1'+R_1''+R_2$ to make it possible for the counter to read wavenumber directly.

(2) The cam bar B is swung to a position in which the straight edge J is parallel to the axis X—X and the screws 25 are adjusted to locate the grating in its mirror position. In that position heterochromatic radiation entering the entrance slit S travels to the grating along the axis E and is reflected without dispersion and then travels along the return path $E_2$ to the exit slit $S_2$.

(3) The adjusting screw 59 is then adjusted to establish the correct off-set relationship $R_1'+R_1''+R_2$ and thus to locate the axis Z—Z accurately on the axis X—X. In this way accurate direct reading linearity is established between the reading of the counter U and the wavenumber $\nu$ of emergent radiation. This step is accomplished by projecting a monochromatic beam into the entrance slit $S_1$, setting the counter U at a reading corresponding to the wavenumber of that monochromatic radiation, and then adjusting the screw 59 until that monochromatic radiation emerges from the exit slit $S_2$.

(4) The correct position of the ball cam K and settings of screws 20a and 20b is tested by projecting radiation of several known wavenumbers one at a time into the entrance slit $S_1$ and making readings of the counter U as the spectrum is scanned. Accurate positioning of these elements exists when the changes in readings of the counter U are proportional to the wavenumber differences of the lines for which the tests are made. The counter is then manipulated to provide direct reading.

In practice the various steps outlined above may be repeated several times until the desired accuracy is attained by successive approximation.

Once having calibrated the monochromator, monochromatic radiation of any predetermined wavenumber may be projected from the exit slit $S_2$ merely by operating the motor T to drive the counter U to such a position that the wavenumber in question is read on the counter. Similarly when the wavelength of any emergent radiation is to be identified, its wavenumber is read directly from the counter. Furthermore, by driving the recording paper of a recorder R at a rate proportional to the speed of rotation of the lead screw, a spectrogram is recorded in which the intensities of various spectral lines are plotted automatically as a function of wavenumbers on a uniform wavenumber scale.

It is thus seen that I have provided an improved monochromator in which the wavenumber of the emergent monochromatic radiation varies in proportion to the angle of rotation of a driving shaft and that this mechanism may be employed to accurately indicate wavenumber and to plot a spectrum accurately in terms of wavenumber on a uniform scale. This invention has particular application to Raman spectroscopy, since it makes it possible to produce Raman sectrograms to the same wavenumber scale even when using exciting radiation of different wavenumbers. Since the spectrograms so ascertained may be easily compared by virtue of the fact that, if the wavenumber corresponding to the exciting lines of each exciting line is taken as the origin, then the abscissae units on all the spectrograms are the same, and the spectrograms will be identical if the Raman spectra are identical, and different only if the Raman spectra are different, as expressed in terms of wavenumber differences.

Though only one specific embodiment of the invention has ben described in detail, it will now be obvious to those skilled in the art that the invention may be embodied in many other equivalent forms without departing from its fundamental principles. For example, the diffraction grating may be stationary and a rotatable mirror located on the incident ray path may reflect incident radiation to the grating and then reflect diffracted radiation along the diffracted ray path. In this case the rotatable mirror comprises the rotatable dispersing element since its rotation changes the wavelength of the dispersed radiation. In effect the image of the diffraction grating is rotated about the axis of rotation of the mirror, the rate of rotation of the grating being twice that of the mirror. In this case, for a given rotation of the rotatable mirror, the effective angular displacement of the grating is twice that of the grating in the specific embodiment of the invention illustrated in the drawings.

It is therefore to be understood that the invention is not limited to the specific embodiment thereof described herein, but includes other embodiments thereof within the scope of the appended claims.

The invention claimed is:

1. In a diffraction grating monochromator:

a support;

variable diffracting means including a diffraction grating and a rotatable member associated with said grating and mounted on said support for rotation about a stationary pivot axis that is parallel to the axis of the grating;

means defining a stationary entrance aperture and means defining a stationary exit aperture, means on said support for transmitting radiation entering said entrance aperture to said grating along a first optic axis and for transmitting radiation diffracted from said grating along a second optic axis through said exit aperture;

a cam element carried by said support and having a cam axis that is parallel to said stationary pivot axis and having a cam surface;

a movable bar secured to said rotatable member and rotatable therewith about said stationary pivot axis and having a cam surface disposed to follow the cam surface of said cam element;

driving means carried by said support for moving said cam element to carry said cam axis along a stationary straight line passing through said stationary pivot axis;

the surface of said cam element and the surface of said movable bar being interengaged and so shaped and dimensioned that the distance of said cam axis from said pivot axis varies in proportion to the cosecant of the effective angular displacement of the grating from its mirror position as said rotatable member is rotated;

and means for indicating displacements of said cam element along said stationary line, whereby changes in wavenumber of dispersed monochromatic radiation transmitted from said entrance aperture to said exit aperture by said grating may be ascertained as a linear function of cam element displacement.

2. In a diffraction grating monochromator:

a support;

variable diffracting means including a diffraction grating and a rotatable member associated with said grating and mounted on said support for rotation about a stationary pivot axis that is parallel to the axis of the grating;

means defining a stationary entrance aperture;

means defining a stationary exit aperture;

means on said support for transmitting radiation entering said entrance aperture to said grating along a first optic axis and for transmitting radiation diffracted from said grating along a second optic axis through said exit aperture;

a cam element carried by said support and having a cam axis that is parallel to said stationary pivot axis and having a cam surface that has a circular cross-section in a plane perpendicular to said stationary pivot axis;

a movable bar secured to said rotatable member and rotatable therewith about said stationary pivot axis, said bar having a straight edge disposed to follow said cam surface;

means carried by said support for moving said cam element to carry said cam axis along a stationary straight line passing through said stationary pivot axis and to rotate said movable bar, whereby the distance of said cam axis from said pivot axis varies in proportion to the cosecant of the effective angular displacement of the grating from its mirror position as the grating is rotated;

and means for indicating displacements of said cam element along said stationary line, whereby changes in wavenumber of dispersed monochromatic radiation transmitted from said entrance aperture to said exit aperture by said grating may be ascertained as a linear function of cam element displacement.

3. In a diffraction grating monochromator:

a support;

variable diffracting means including a diffraction grating and a rotatable member associated with said grating and mounted on said support for rotation about a stationary pivot axis that is parallel to the axis of the grating;
means defining a stationary entrance aperture;
means defining a stationary exit aperture;
means on said support for transmitting radiation entering said entrance aperture to said grating along a first optic axis and for transmitting radiation diffracted from said grating along a second optic axis through said exit aperture;
a spherical cam carried by said support;
a movable bar secured to said rotatable member and rotatable therewith about said stationary pivot axis and having a straight edge;
a pad having a hemispherical cavity on one side thereof for receiving said spherical cam and a flat surface slidable along said straight edge;
means adjacent said support for moving said spherical cam to carry its center along a stationary straight line passing through said stationary pivot axis and to rotate said movable bar, whereby the distance of the cam axis from said pivot axis varies in proportion to the cosecant of the effective angular displacement of the grating from its mirror position as the grating is rotated;
and means for indicating displacements of said spherical cam along said stationary line, whereby changes in wavenumber of dispersed monochromatic radiation transmitted from said entrance aperture to said exit aperture by said grating may be ascertained as a linear function of cam displacement.

4. In a diffraction grating monochromator:
a support;
variable diffracting means including a diffraction grating and a rotatable member associated with said grating and mounted on said support for rotation about a stationary pivot axis that is parallel to the axis of the grating;
means defining a stationary entrance aperture stop and means defining a stationary exit aperture stop;
means on said support for transmitting radiation through said entrance aperture stop to said grating along a first optic axis and for transmitting radiation diffracted from said grating along a second optic axis through said exit aperture stop;
a lead screw mounted on said support and carrying a nut restrained against rotation about the axis of said lead screw;
a cam element movable with said nut and having a cam axis that moves on a straight line passing through said pivot axis;
a movable bar secured to said rotatable member and having a cam surface adapted to follow said cam element,
the surface of said cam element and the surface of said movable bar being interengaged and so shaped and dimensioned, and so located that the distance of said cam axis from said pivot axis varies in proportion to the cosecant of the effective angular displacement of the grating from its mirror position as the grating is rotated;
and means movable in accordance with the angle of rotation of said lead screw for indicating on a linear scale changes in wavenumber of dispersed monochromatic radiation transmitted from said entrance aperture stop to said exit aperture stop by said grating.

5. In a diffraction grating monochromator:
a support;
variable diffracting means including a diffraction grating and a rotatable member associated with said grating and mounted on said support for rotation about a stationary pivot axis that is parallel to the axis of the grating;
means defining a stationary entrance aperture;
means defining a stationary exit aperture;
means on said support for transmitting radiation through said entrance aperture to said grating along a first optic axis and for transmitting radiation diffracted from said grating along a second optic axis through said exit aperture;
a lead screw carried by said support and carrying a nut restrained against rotation about the axis of said lead screw;
a guide rail mounted on said support extending in about the same direction as said lead screw;
a movable carriage slidable on said guide rail, said carriage being coupled to said nut to move with said nut when said lead screw is rotated;
a cam element mounted on said carriage and having a cam axis movable along a straight line passing through said pivot axis;
a movable bar secured to said rotatable member and having a cam surface adapted to follow said cam element;
the surface of said cam element and the surface of said movable bar being interengaged and so shaped and dimensioned, and so located that the distance of said cam axis from said pivot axis varies in proportion to the cosecant of the effective angular displacement of the grating from its mirror position as the grating is rotated;
and means movable in accordance with the angle of rotation of said lead screw for indicating on a linear scale changes in wavenumber of dispersed monochromatic radiation transmitted from said entrance aperture to said exit aperture by said grating.

6. In a diffraction grating monochromator:
a support;
variable diffracting means including a diffraction grating rotatably mounted on said support for rotation about a stationary pivot axis that is parallel to the axis of the grating;
means associated with said support providing a stationary entrance aperture and a stationary exit aperture;
means carried by said support and positioned to receive radiation entering said entrance aperture and for transmitting such radiation to said grating along a first optical axis and for receiving diffracted radiation from said grating and transmitting such diffracted radiation along a second optical axis to said exit aperture;
a carriage mounted on said support and movable in a stationary straight line;
cam means carried by and movable with said carriage and having a cam axis movable in a stationary straight line passing through said stationary pivot axis, said cam means having a cam surface;
a movable bar secured to said grating and rotatable therewith about said stationary pivot axis, said movable bar having a cam surface engaging with said cam surface of said cam means and disposed to follow such cam means;
driving means carried by said support for moving said carriage and its cam element along said stationary straight lines;
and means for causing said movable arm to follow said cam element as its axis is moved along its said straight line, whereby the distance of said cam axis from said stationary pivot axis of said grating varies in proportion to the cosecant of the effective angular displacement of the grating as the latter is rotated.

7. A monochromator as in claim 6 including means for indicating displacements of said cam means along its said stationary line and causing changes in wavenumber of dispersed monochromatic radiation transmitted to said exit aperture by said grating to be shown as a linear function of displacement of said cam means.

8. A spectrometer comprising:
a plane diffraction grating;

a support rigidly carrying the grating for rotation about an axis parallel to its grating lines;

means for imparting motion to the grating comprising a lever arm rigid with said support and an actuating member movable along the straight edge of said lever arm with a point of said actuating member maintained a fixed distance from said straight edge; and means for moving said actuating member comprising a lead screw operable to move the actuating member in a direction such that said point moves in a fixed straight line that passes through said axis of rotation.

9. A spectrometer as defined in claim 8 including means driven in synchronism with the rotation of said lead screw for indicating the change in wavenumber of radiation incident on said grating in a predetermined direction and then diffracted therefrom in a predetermined direction.

10. A spectrometer comprising:

a rigid support member carrying a plane diffraction grating having grating lines thereon, said support member being rotatable about a fixed axis parallel to said grating lines, said support member having a straight edge, in a plane transverse to said fixed axis;

an actuating member having a part of its periphery of circular contour;

means for moving said actuating member comprising a lead screw operable to move the actuating member in a direction such that the center of curvature of said circular portion moves in a fixed straight line that passes through said axis of rotation; and means for maintaining the center of curvature of said circular contour a fixed distance from the straight edge of said lever arm as said center of curvature is moved in said fixed straight line.

11. In a diffraction grating monochromator:

a base member;

variable diffracting means including a diffraction grating mounted on said support for rotation about a stationary pivot axis that is parallel to the axis of the grating;

means for defining a stationary entrance aperture stop and means defining a stationary exit aperture stop;

means for transmitting radiation through said entrance aperture stop to said grating along a first optic axis and for transmitting radiation diffracted from said grating along a second optic axis through said exit aperture stop;

means for imparting motion to the grating comprising a rotatable member secured to said grating and having a straight edge and also comprising a cam element of circular cross-section engaging said straight edge; and means comprising a lead screw mounted on said support member and operable to move said cam element along a fixed straight line that passes through said axis of rotation.

12. A monochromator as defined in claim 11 including means driven in synchronism with the rotation of said lead screw for indicating the change in wavenumber of radiation incident on said grating in a predetermined direction and then diffracted therefrom in a predetermined direction.

13. In a spectrometer:

a support member carrying a diffraction grating, said support member being rotatable about a stationary pivot axis parallel to the axis of said grating, said support member having a straight edge in a plane transverse to said pivot axis;

a cam element having a part of its periphery of circular contour engaging said straight edge; and means for moving said cam element comprising a lead screw operable to move the cam element in a direction such that the center of curvature of said circular part moves in a fixed straight line that passes through said pivot axis.

References Cited

UNITED STATES PATENTS

| | | | |
|---|---|---|---|
| 1,282,553 | 10/1918 | Eaton | 235—61 |
| 2,305,776 | 12/1942 | Hansen | 88—14 |
| 2,398,198 | 4/1946 | Strang et al. | 74—59 |
| 2,445,044 | 7/1948 | Stamm et al. | 88—14 |
| 2,527,122 | 10/1950 | Heigl et al. | 88—14 |
| 2,548,548 | 4/1951 | Menzies et al. | 88—14 |
| 2,721,031 | 10/1955 | Mathieu | 235—61 |
| 2,931,266 | 4/1960 | Martin | 88—14 |

OTHER REFERENCES

Publication entitled, "A Vacuum Spectrograph for the Infra-Red," found in The Review of Scientific Instruments, by Badger, Zumwalt and Giguere, vol. 19, No. 12, December 1948, pp. 861–865.

Publication entitled, "A Small Plane Grating Monochromator," found in The Journal of the Optical Society of America, by William G. Fastie, vol. 42, No. 9, September 1952, pp. 641–647, especially p. 644.

JEWELL H. PEDERSEN, *Primary Examiner.*

R. L. WIBERT, *Assistant Examiner.*

UNITED STATES PATENT OFFICE
CERTIFICATE OF CORRECTION

Patent No. 3,414,356

December 3, 1968

Henry H. Cary

It is certified that error appears in the above identified patent and that said Letters Patent are hereby corrected as shown below:

Column 2, line 68, "tograms" should read -- trograms --. Column 4, line 70, "chdomatic" should read -- chromatic --. Column 10, line 55, after "center" insert -- line --; line 58, cancel "both". Column 11, line 40, cancel "Since"; same line 40, "the" should read -- The --; line 42, "lines", first occurrence, should read -- line --; same line 42, "exciting line", second occurrence, should read -- spectrogram --. Column 12, line 2, "axis" should read -- lines --; line 39, "axis" should read -- lines --. Column 13, lines 2, 37, and 72, "axis", each occurrence, should read -- lines --. Column 14, line 36, "axis" should read -- lines --. Column 15, line 34, "lever arm" should read -- support member --; line 37, "base" should read -- support --; line 39, before "for" insert -- member --; line 40, "axis", second occurrence, should read -- lines --. Column 16, line 17, "axis", second occurrence, should read -- lines --.

Signed and sealed this 9th day of June 1970.

(SEAL)
Attest:

EDWARD M. FLETCHER, JR.
Attesting Officer

WILLIAM E. SCHUYLER, JR.
Commissioner of Patents